(12) United States Patent
Fang et al.

(10) Patent No.: US 12,539,792 B2
(45) Date of Patent: Feb. 3, 2026

(54) INDICATOR ASSEMBLY OF A SUPPORTING LEG DEVICE FOR A SAFETY SEAT AND SAFETY SEAT

(71) Applicant: BAMBINO PREZIOSO SWITZERLAND AG, Steinhausen (CH)

(72) Inventors: Ganqing Fang, Guangdong (CN); Daliang Zhang, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 34 days.

(21) Appl. No.: 18/250,051

(22) PCT Filed: Oct. 20, 2021

(86) PCT No.: PCT/IB2021/059665
§ 371 (c)(1),
(2) Date: Apr. 21, 2023

(87) PCT Pub. No.: WO2022/084880
PCT Pub. Date: Apr. 28, 2022

(65) Prior Publication Data
US 2023/0391234 A1    Dec. 7, 2023

(30) Foreign Application Priority Data
Oct. 22, 2020    (CN) .......................... 202011137746.9

(51) Int. Cl.
*B60N 2/28*    (2006.01)
(52) U.S. Cl.
CPC ......... *B60N 2/2824* (2013.01); *B60N 2/2887* (2013.01)
(58) Field of Classification Search
CPC ................................................... B60N 2/2824
See application file for complete search history.

(56) References Cited

U.S. PATENT DOCUMENTS 9,221,368 B2    12/2015    Hou et al.
11,691,543 B2    7/2023    Ma et al.
(Continued)

FOREIGN PATENT DOCUMENTS

CN    103042953 A    4/2013
CN    203267824 U    11/2013
(Continued)

OTHER PUBLICATIONS

CN-102729854-A, Oct. 17, 2012, Guo, B60N2/2824, figures 1-3 and paragraph [0029] (Year: 2012).*
(Continued)

*Primary Examiner* — David R Dunn
*Assistant Examiner* — Tania Abraham
(74) *Attorney, Agent, or Firm* — CANTOR COLBURN LLP

(57) ABSTRACT

An indicator assembly of a supporting leg device for a safety seat and a safety seat are provided. The indicator assembly includes an indicator housing having an indicator window; an indicating member including a first area and a second area adjacent to each other; a first elastic member for pivoting the indicating member to a first position in a first direction; a pushing member, a top end of which pushing the indicating member to pivot to a second position in a second direction; a driving member including an upper end provided with an engaging hook and a lower end capable of touching a floor, in which the engaging hook can be engaged into the engaging hole of the pushing member. According to the indicator assembly of the present disclosure, a user can observe whether the supporting leg device touches the floor of a vehicle without leaning over.

12 Claims, 11 Drawing Sheets

(56) References Cited

U.S. PATENT DOCUMENTS

| | | | |
|---|---|---|---|
| 2014/0327281 | A1 | 11/2014 | Hou et al. |
| 2021/0316642 | A1 | 10/2021 | Ma et al. |

FOREIGN PATENT DOCUMENTS

| | | | | |
|---|---|---|---|---|
| CN | 203666434 | U | 6/2014 | |
| CN | 204020627 | U | 12/2014 | |
| CN | 204077432 | U | 1/2015 | |
| CN | 105329123 | A | 2/2016 | |
| CN | 205344586 | U | 6/2016 | |
| CN | 107813738 | A | 3/2018 | |
| CN | 108082012 | A | 5/2018 | |
| CN | 207697564 | U | 8/2018 | |
| CN | 208359971 | U | 1/2019 | |
| CN | 109398174 | A | 3/2019 | |
| CN | 208585134 | U | 3/2019 | |
| CN | 109823242 | A | 5/2019 | |
| CN | 110525293 | A | 12/2019 | |
| CN | 107826001 | B | 5/2020 | |
| CN | 210502383 | U | 5/2020 | |
| CN | 211543324 | U | 9/2020 | |
| CN | 212171999 | U | 12/2020 | |
| CN | 212172000 | U | 12/2020 | |
| DE | 202007013091 | U1 | 1/2008 | |
| DE | 202009001975 | U1 | 5/2009 | |
| DE | 202013103189 | U1 | 11/2013 | |
| DE | 202013011961 | U1 * | 1/2015 | ........... B60N 2/2824 |
| DE | 202015104792 | U1 | 11/2015 | |
| EP | 2210769 | A2 | 7/2010 | |
| FR | 2864482 | A1 | 7/2005 | |
| GB | 2490414 | A | 4/2012 | |
| GB | 2523447 | A | 8/2015 | |
| JP | 2013159339 | A | 8/2013 | |
| JP | 2015117020 | A | 6/2015 | |
| JP | 2017105348 | A | 6/2017 | |
| JP | 2018526282 | A | 9/2018 | |
| JP | 2023552115 | A | 12/2023 | |
| TW | 200714496 | A | 9/2005 | |
| TW | 201601951 | A | 1/2016 | |

OTHER PUBLICATIONS

U.S. Appl. No. 18/037,867; Non-Final Office Action dated Aug. 20, 2024; 16 pages.
Chinese Application No. 2020111377469; First Office Action dated May 16, 2024; 15 pages.
Japanese Application No. 2023-524668; Decision to Grant dated May 7, 2024; 5 pages.
Japanese Application No. 2023-532130; Notice of Reasons for Refusal dated May 7, 2024; 6 pages.
Taiwanese Application No. 112134041; First Office Action dated Mar. 25, 2024; 12 pages.
International Search Report for International Application No. PCT/EP2022/050159; International Filing Date: Jan. 5, 2022; Date of Mailing: Apr. 4, 2022; 3 pages.
International Search Report for International Application No. PCT/IB2021/059665; International Filing Date: Oct. 20, 2021; Date of Mailing: Jan. 28, 2022; 2 pages.
Taiwanese Application No. 11120859730; Taiwanese Office Action dated Sep. 1, 2022; 8 pages.
Taiwanese Application No. 11121178560; Taiwanese Office Action dated Nov. 30, 2022; 8 pages.
Written Opinion for International Application No. PCT/EP2022/050159; International Filing Date: Jan. 5, 2022; Date of Mailing: Apr. 4, 2022; 5 pages.
Written Opinion for International Application No. PCT/IB2021/059665; International Filing Date: Oct. 20, 2021; Date of Mailing: Jan. 28, 2022; 5 pages.
Taiwanese Application No. 112106850; Taiwanese Office Action dated Aug. 30, 2023; 9 pages.
TW 1st Office Action with English Translation; Application No. 113149598; Date Mailed: Jul. 10, 2025; pp. 1-18.
JP 1st Office Action with English Translation; Appl No. 2024-158722; Date Mailed: Nov. 4, 2025; pp. 1-6.

* cited by examiner

INDICATOR ASSEMBLY OF A SUPPORTING LEG DEVICE FOR A SAFETY SEAT AND SAFETY SEAT

CROSS-REFERENCE TO RELATED APPLICATIONS

This application is a National Stage application of PCT/IB2021/059665, filed Oct. 20, 2021, which claims the benefit of Chinese application No. 202011137746.9, filed Oct. 22, 2020, both of which are incorporated by reference in their entirety herein.

TECHNICAL FIELD

This disclosure relates to the technical field of a safety seat, and more particularly, to an indicator assembly of a supporting leg device for a safety seat.

BACKGROUND

A child safety seat is a kind of seat specially designed for children at different ages and effectively improving safety of the children in a vehicle.

It is provided with a supporting leg device for a child's safety seat, which is installed on a base of the child's safety seat and supported on a floor of the vehicle, thus enhance the anti-overturning and anti-impact capability of child's safety seat and protect child safe.

SUMMARY

As embodied and generally described herein, in order to achieve these and other advantages and according to an object of the present disclosure, an indicator assembly of a supporting leg device for a safety seat is proposed. The indicator assembly includes: an indicator housing positioned at an upper end of the supporting leg device and having an indicator window that is formed by penetrating through the indicator housing in a penetrating manner; an indicating member including a first area and a second area which are adjacent to each other and have different colors or patterns, the indicating member being pivotally accommodated in the indicator housing so that the first area and the second area can be alternatively exposed from the indicator window; a first elastic member disposed in the indicator housing and driving the indicating member to pivot to a first position along a first direction; an pushing member extending in a longitudinal direction of the supporting leg device inside the supporting leg device, being movable vertically, and having a plurality of engaging holes arranged longitudinally, and a top end of the pushing member capable of pushing the indicating member to pivot to a second position in a second direction opposite to the first direction; a driving member extending in a longitudinal direction of the supporting leg device inside the supporting leg device, being movable vertically, and including an upper end provided with an engaging hook and a lower end capable of touching a floor, in which the engaging hook is operably engaged into one of the plurality of engaging holes of the pushing member; wherein when the lower end of the driving member does not touch the floor, the indicating member pivots to the first position in the first direction under the acting force of the first elastic member such that the first area is exposed from the indicating window; and when the lower end of the driving member touches the floor, the driving member drives the pushing member to move upward by means of the engagement of the engaging hook and the engaging hole, thus the top end of the pushing member pushes the indicating member and overcomes the acting force of the first elastic member and pivots to the second position in the second direction, so that the second area is exposed from the indicating window.

In one embodiment, the supporting leg device includes: a first tubular member, the upper end of which is connected to the indicator housing, and the first tubular member is provided with a plurality of stage locking holes arranged longitudinally; and a second tubular member slidably disposed inside the first tubular member, and a stage locking member is arranged in the second tubular member; wherein the stage locking member is operably engaged into one of the plurality of the stage locking holes, so as to lock a position of the second tubular member relative to the first tubular member.

In one embodiment, the stage locking member is provided with a positioning pin supported on an inner wall of the second tubular member such that the stage locking member is pivotable within the second tubular member.

In one embodiment, a longitudinally extended pulling rod is disposed within the second tubular member, and the pulling rod is movable vertically rather than horizontally within the second tubular member; an inclined slot is disposed at a top end of the pulling rod, a driving slot is disposed on an upper part of the driving member, a driving pin is disposed on the stage locking member, and the driving pin passes through the inclined slot and the driving slot; an inclined direction of the inclined slot is set such that when the pulling rod moves downward, the inclined slot forces the driving pin to be displaced in a horizontal direction, thus the driving pin drives the stage locking member to disengage from the stage locking hole; simultaneously, the driving pin also drives the driving slot, and further drives an upper part of the driving member to be displaced in the horizontal direction, thereby disengaging the engaging hook on the upper end of the driving member from the engaging hole of the pushing member.

In one embodiment, an upper part of the pulling rod has a U-shaped opening, in which the stage locking member is located, and the inclined slots are disposed on two opposite sides of the U-shaped opening.

In one embodiment, a driving slope is disposed at a bottom end of the pulling rod, and a stage adjustment button is disposed at a bottom end of the second tubular member and is provided with a button slope in contact with the driving slope, and the inclined directions of the driving slope and the button slope are set such that when the stage adjustment button is pressed, the button slope and the driving slope interact to make the pulling rod move downward.

In one embodiment, a second elastic member is disposed at a bottom end of the pulling rod, and forces the pulling rod to move upward.

In one embodiment, a supporting slot is disposed at a lower part of the driving member, and a supporting pin secured to the pulling rod passes through the supporting slot such that the driving member is vertically movably supported on the pulling rod and the driving member is pivotable around the support pin.

In one embodiment, a tension spring is installed between the lower part of the driving member and the lower part of the pulling rod, and the tension spring is arranged to drive the driving member to move downward relative to the pulling rod.

In one embodiment, the pushing member is vertically movably arranged on an inner side wall of the first tubular member.

In one embodiment, a floor touching member is disposed at the lower end of the driving member, and a bottom of the floor touching member is enclosed by an anti-collision and anti-sliding member.

In another solution, a safety seat employing the indicator assembly of the supporting leg device for the safety seat as above mentioned is proposed.

The foregoing objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are incorporated in and constitute a part of this specification, illustrate examples of the present disclosure, together with the description serve to explain principles of the present disclosure.

In the drawings.

Figure 1:
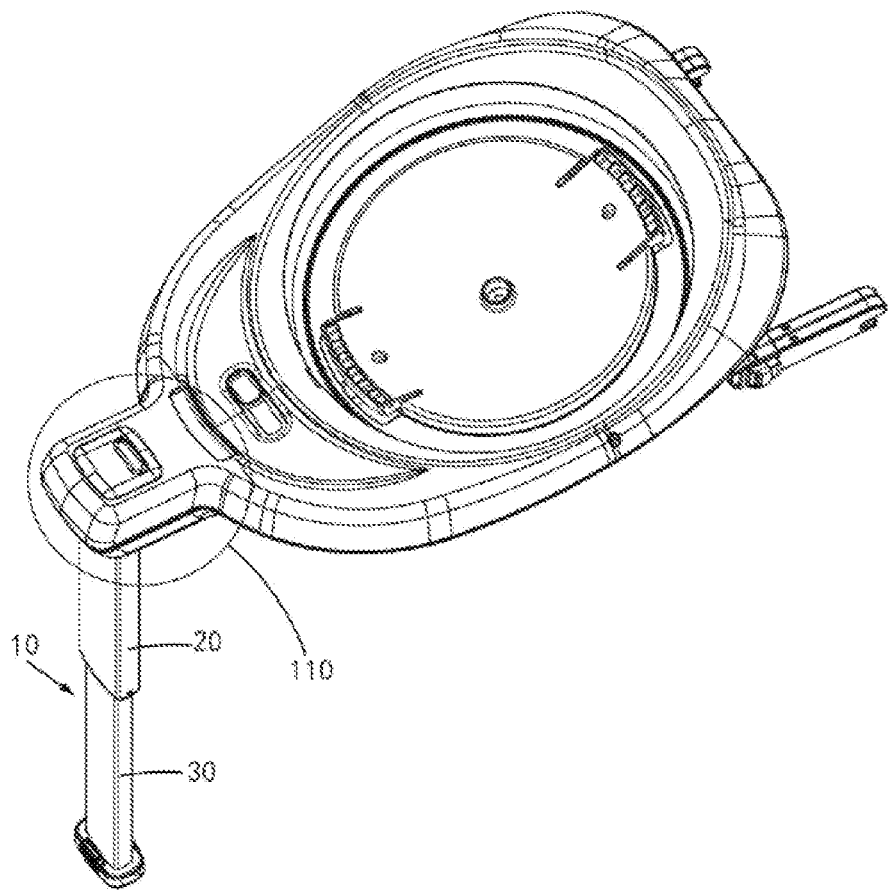
FIG. 1 is a perspective view of a base and a supporting leg device for a safety seat.

Reference numbers are listed as follows:
10 supporting leg device
20 first tubular member
   21 stage engaging hole
   22 inner side wall
   23 groove
30 second tubular member
40 frame
100 indicating member
   101 first area
   102 second area
   103 pivot shaft
110 indicator housing
   111 indicator window
120 first elastic member
200 pushing member
   210 engaging hole
   220 top end
300 driving member
   310 engaging hook
   320 lower end
      321 floor touching member
      322 anti-collision and anti-sliding member
   330 driving slot
   340 supporting slot
   350 tension spring
   360 rivet
400 stage locking member
   410 driving pin
   420 positioning pin
500 pulling rod
   510 inclined slot
   520 two opposite sides of a U-shaped opening
   530 driving slope
   540 second elastic member
   550 supporting pin
   560 limiting slot
   570 limiting shaft
   580 wing
600 stage adjustment button
   610 button slop

DETAILED DESCRIPTION

The present disclosure will be described in detail with reference to the accompanying drawings.

In an embodiment shown in FIG. 1, a supporting leg device 10 is disposed at the front end of a base of a safety seat. The lower end of the supporting leg device 10 may be supported on a floor in a vehicle in use. The supporting leg device 10 includes a first tubular member 20 and a second tubular member 30. The second tubular member 30 is slidably disposed in the first tubular member 20, so that the supporting leg device 10 can be expanded and contracted. Therefore, when the safety seat is placed on a car seat, the lower end of the supporting leg device 10 can reach the floor in the vehicle by adjusting the length of the supporting leg device 10.

Hereinafter, a structure for displaying whether the supporting leg device 10 touches the floor will be described in detail.

An indicator assembly according to the present disclosure is attached to the supporting leg device 10. The indicator assembly includes an indicator housing 110, an indicating member 100, a first elastic member 120, a pushing member 200 and a driving member 300. The indicator housing 110 is positioned at the upper end of the supporting leg device 10, more particularly connected to the upper end of the first tubular member 20, and has an indicator window 111. The indicating member 100 is pivotally accommodated in the indicator housing 110. The first elastic member 120 is disposed in the indicator housing 110 for driving the indicating member 100 to pivot in a first direction. The pushing member 200 and the driving member 300 both are located inside the supporting leg device 10 and extend along a longitudinal direction of the supporting leg device 10.

As shown in FIG. 1, the indicator housing 110 may be formed as a connecting portion for connecting the supporting leg device 10 and the base of the safety seat. Therefore, the indicator housing 110 may be integrally formed with the supporting leg device 10 and the base of the safety seat, to have sufficient strength therebetween, so as to ensure that the supporting leg device 10 plays a supporting role on the safety seat. Of course, for the convenience of manufacturing and transportation, the indicator housing, the supporting leg device and the base of the safety seat may be separately manufactured, and then assembled together by screwing, riveting or welding.

Figure 2:
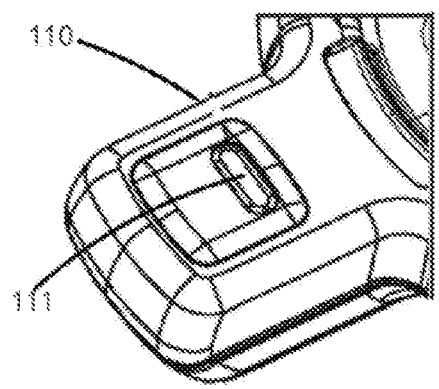
FIG. 2 is an enlarged view of an indicator housing of an indicator assembly of the supporting leg device for the safety seat according to the present disclosure.

An indicator window 111 is formed on the indicator housing 110 and penetrates through the indicator housing 110. In the embodiments shown in FIGS. 1 and 2, the indicator window 111 is formed on the top of the indicator housing 110, so that a user can observe the indicator window 111 more conveniently from above. However, it should be understood that the indicator window 111 may also be formed at the side of the indicator housing 110, so that the user can laterally observe the indicator window 111.

The indicating member 100 is pivotably accommodated in the indicator housing 110. The indicating member 100 includes a first area 101 and a second area 102 on the outer surface thereof. By means of the pivoting of the indicating member 100, the first area 101 and the second area 102 can be alternatively exposed from the indicator window 111. The first area 101 and the second area 102 may have different colors, such as red and green; or have different patterns, such as characters or figures, so as to be able to display different states of the indicator assembly. For example, when the supporting leg device 10 does not touch the floor, the first area 101 of the indicating member 100 is exposed from the indicator window 111; and when the supporting leg device 10 touches the floor, the second area 102 of the indicating member 100 is exposed from the indicator window 111. Therefore, the user can clearly know whether the supporting leg device 10 touches the floor.

Figure 4:
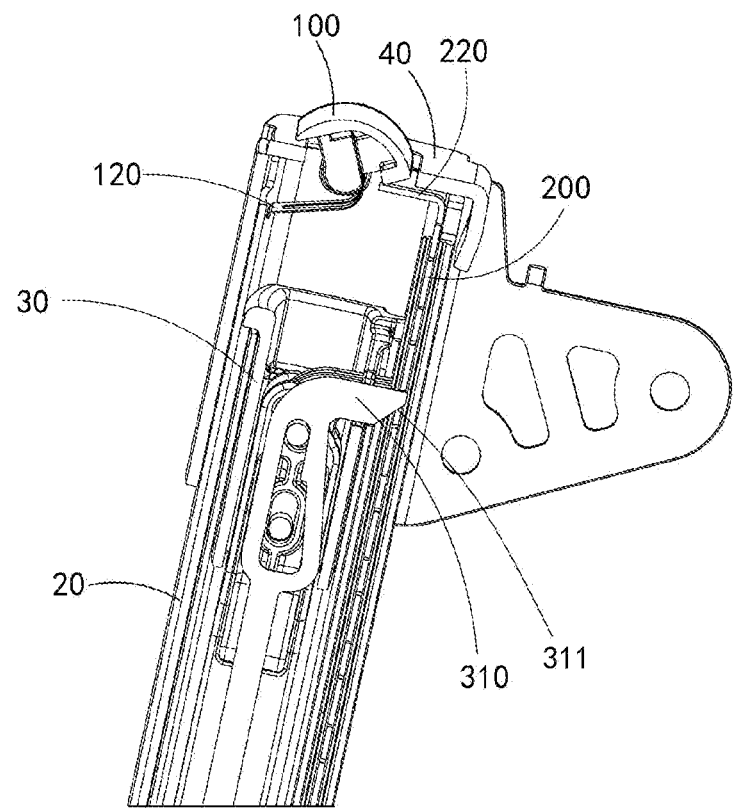
FIG. 4 is a sectional view showing an assembling relationship between most parts of the indicator assembly and the supporting leg device.
Figure 4:
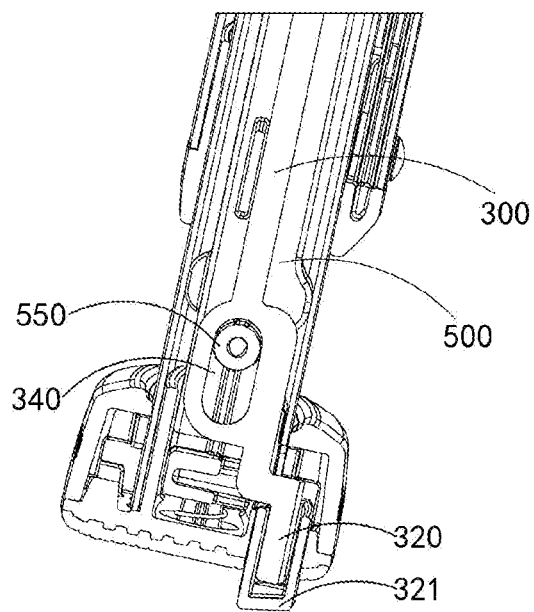
Figure 12:
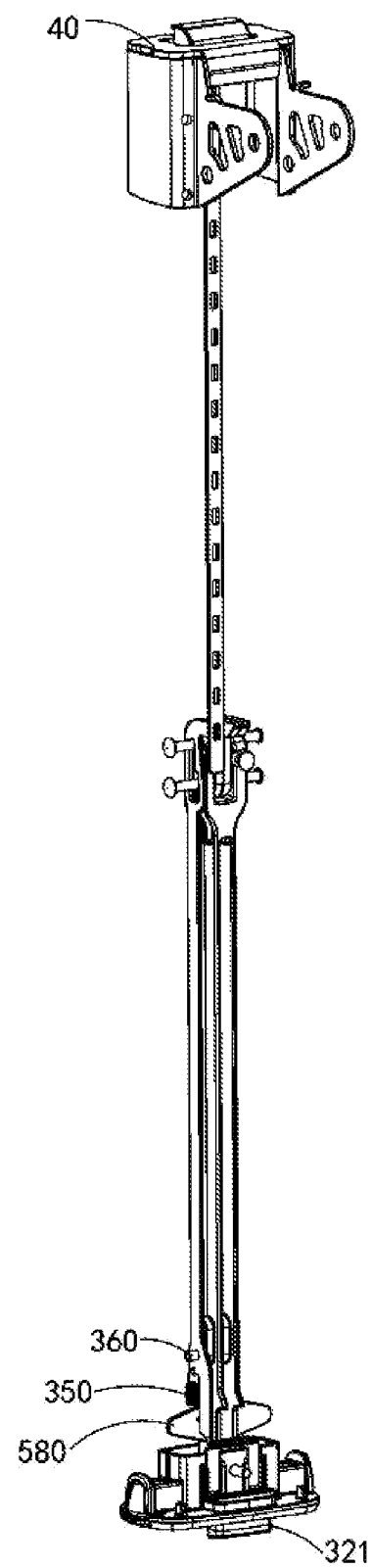
FIG. 12 is a perspective view showing the indicator assembly after extending the supporting leg device, especially showing a position of a tension spring.

In order to facilitate the pivoting of the indicating member 100, pivot shafts 103 may be formed on both sides of the indicating member 100, and are rotatably supported on the indicator housing 110 or at the top end of the supporting leg device 10 (i.e., the first tubular member or on a frame 40 placed at the top end of the supporting leg device 10 (i.e., the first tubular member 20), as shown in FIGS. 4 and 12, so that the indicating member 100 pivots within the indicator housing 110 around the pivot shafts 103. In other embodiments, the indicating member 100 may also pivot by other means such as sliding rails.

Figure 6:
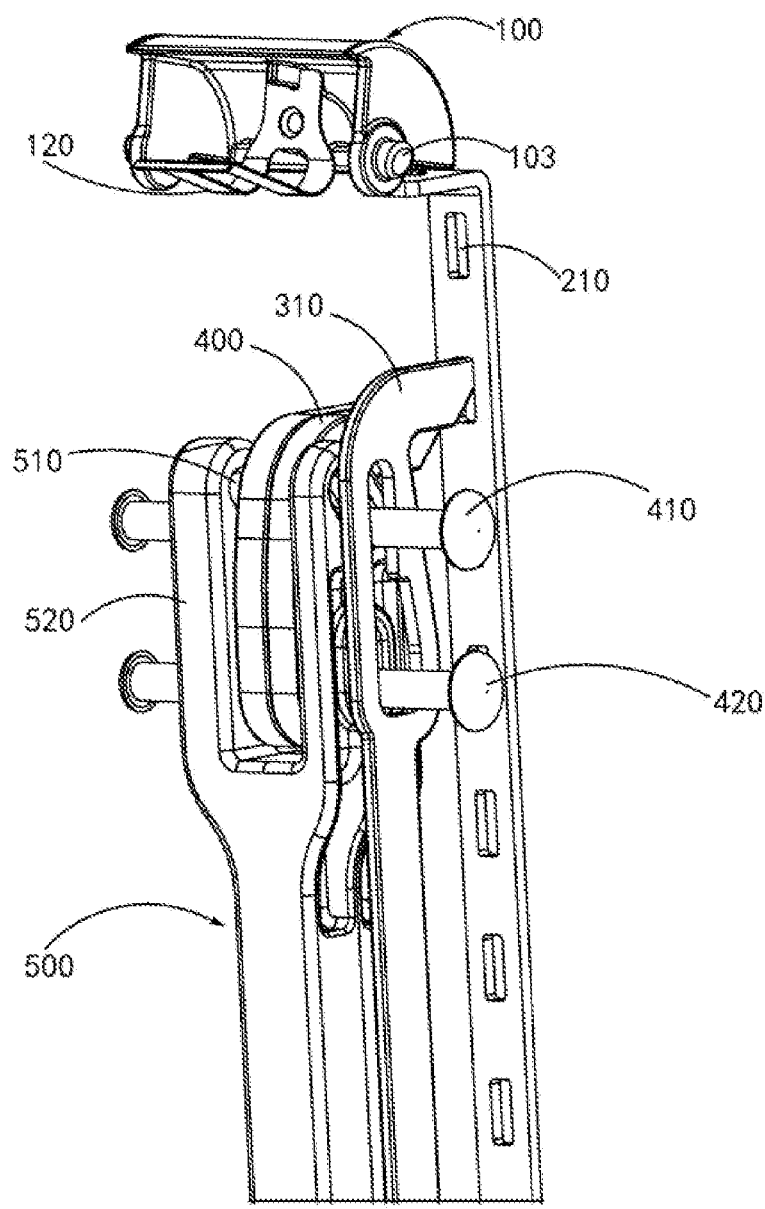
FIG. 6 is an enlarged view of some parts of the upper half of the indicator assembly in FIG. 5.

When the supporting leg device 10 does not touch the floor, in order to ensure that the first area 101 is exposed from the indicator window 111, a first elastic member 120 is also disposed in the indicator housing 110, and drives the indicating member 100 to pivot to a first position in a first direction. When the indicating member 100 is in the first position, the first area 101 is exposed from the indicator window 111. The first elastic member 120 is made of an elastic material and may be a spring, an elastic sheet or any elastic element capable of providing driving force. Furthermore, the first elastic member 120 may be integrally formed with the indicating member 100, or the first elastic member 120 and the indicating member 100 may be separately formed and assembled together. The first elastic member 120 may be in any shape, such as the shape of the elastic sheet as shown in FIG. 6, but the present disclosure is not limited thereto.

When the supporting leg device 10 touches the floor, the indicating member 100 is driven mainly by the pushing member 200 and the driving member 300 to pivot to a second position in a second direction opposite to the first direction. When the indicating member 100 is in the second position, the second area 102 is exposed from the indicator window 111. Hereinafter, the pushing member 200 and the driving member 300 will be described in detail, both of which are located inside the supporting leg device 10, as shown in FIG. 4.

Figure 3:
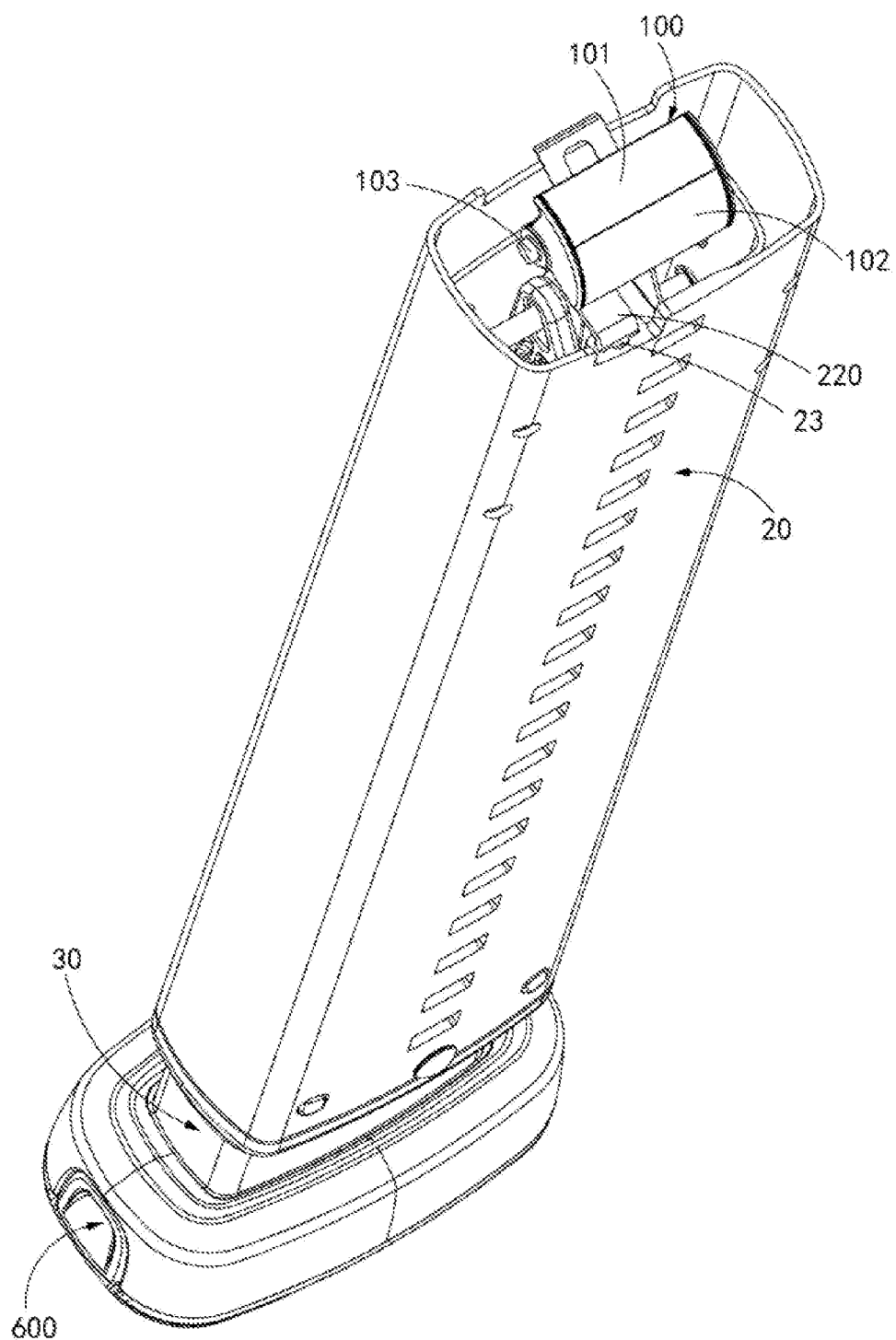
FIG. 3 shows that most parts of the indicator assembly are located inside the supporting leg device.
Figure 11:
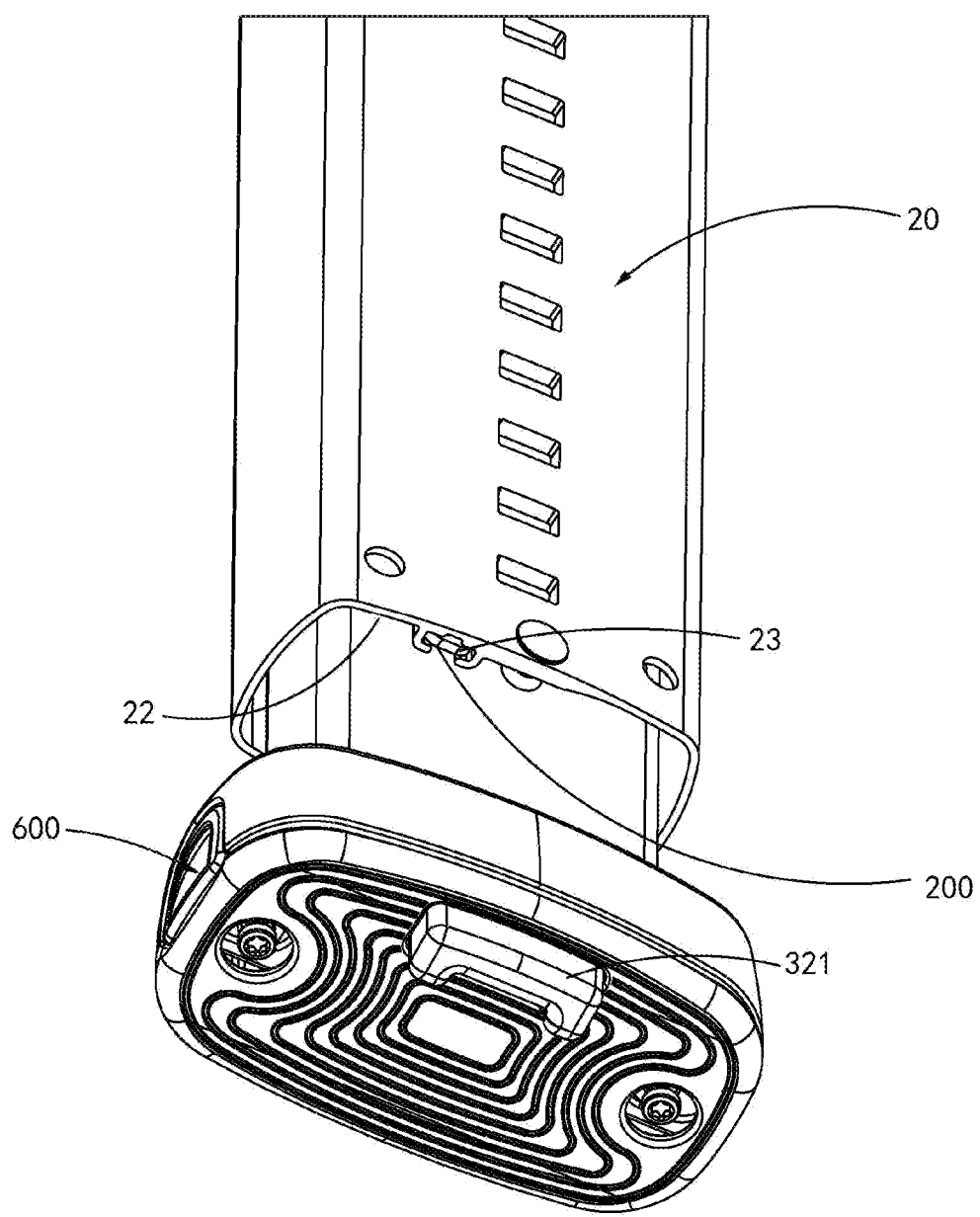
FIG. 11 is a perspective view of the lower half of the supporting leg device, especially showing the matching relationship between the pushing member and a first tubular member.

The pushing member 200 is located inside the first tubular member 20 and is movable vertically relative to the first tubular member 20. In one embodiment, the pushing member 200 is disposed on the inner side wall of the first tubular member 20. As shown in FIGS. 3 and 11, a longitudinally extending groove 23 is disposed on the inner side wall of the first tubular member 20, and the pushing member 200 is an elongated member extending in a longitudinal direction of the supporting leg device 10 (see FIG. 5), so that the elongated member may be inserted into the groove 23 and moved vertically along the groove 23. It should be understood that the pushing member 200 may also have another structure to move vertically inside the first tubular member 20.

A top end 220 of the pushing member 200 may be connected with or in contact with the indicating member 100, or may be separated from the indicating member 100 at a small distance, so that the top end 220 of the pushing member 200 can push the indicating member 100, so as to make the indicating member pivot in the second direction against an acting force of the first elastic member 120 when the pushing member 200 moves upward.

The top end 220 may have any shape, such as a circle or a square, as long as the top end can push the indicating member 100 to pivot.

The pushing member 200 also has a plurality of engaging holes 210 arranged longitudinally, which may be spaced apart at the same distance or at different distances.

An upward movement of the pushing member 200 is mainly realized by the driving member 300. The driving member 300 is located inside the second tubular member 30 and can move vertically relative to the second tubular member 30.

Figure 5:
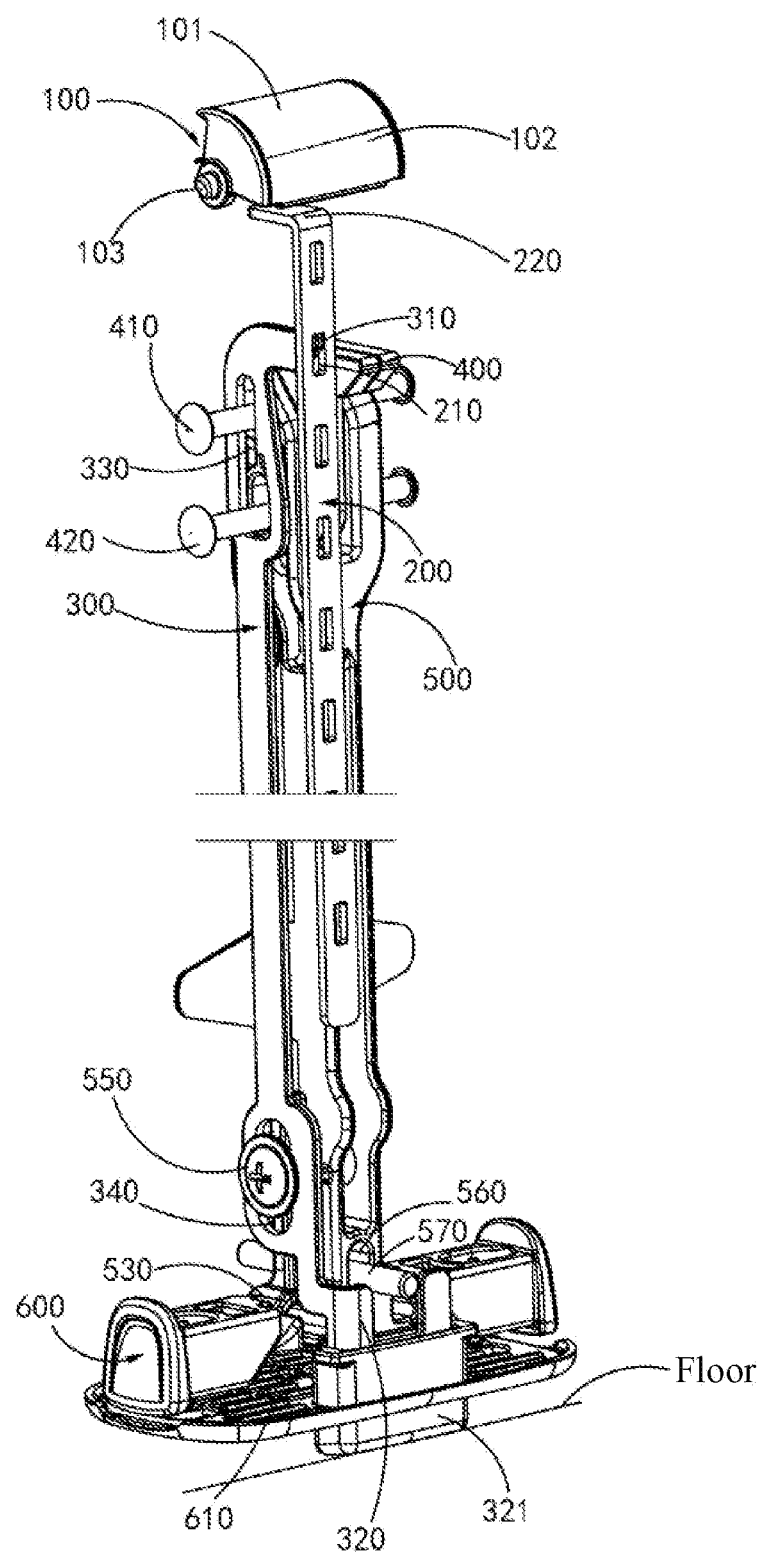
FIG. 5 is a perspective view of the indicator assembly after removing the indicator housing and the supporting leg device.
Figure 13:
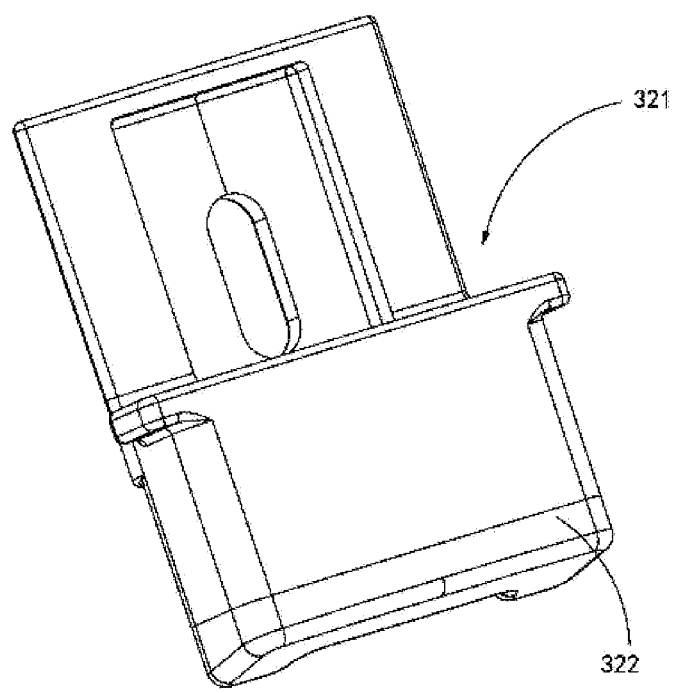
FIG. 13 is a perspective view of a floor touching member.

The driving member 300 includes an upper end provided with an engaging hook 310 and a lower end 320 for touching the floor. The driving member 300 moves upward relative to the second tubular member 20 when the lower end 320 of the driving member 300 touches the floor. It should be noted that the lower end 320 of the driving member 300 can touch the floor, including that the lower end 320 directly and indirectly touch the floor, in which the lower end indirectly touching the floor refers to for example, the lower end 320 is provided with a floor touching member, as shown in FIGS. 4 and 5. The floor touching member 321 may be entirely made of a rubber to avoid damaging the vehicle floor during contacting with the vehicle floor. Alternatively, the bottom portion of the floor touching member 321 is enclosed by an anti-collision and anti-sliding member 322, as shown in FIG. 13. The anti-collision and anti-sliding member 322 is made of a thermoplastic elastomer material (i.e., TPE material).

The engaging hook 310 at the upper end of the driving member 300 is operably engaged into one of the engaging holes 210 of the pushing member 200, wherein the size of the engaging hook 310 is slightly smaller than that of the engaging hole 210. In an embodiment, the size of the engaging hook 310 is similar to that of the engaging hole 210, so that the engaging hook 310 is tightly engaged into the engaging hole 210.

After the engaging hook 310 is operably engaged into one of the engaging holes 210, the driving member 300 and the pushing member 200 form a linkage, for example, the upward movement of the driving member 300 drives the pushing member 200 to move upward. On the other hand, the engaging hook 310 may also be operably separated from the engaging hole 210, so that the driving member 300 and the pushing member 200 no longer form linkage, thereby avoiding hindering the sliding of the second tubular member 30 relative to the first tubular member 20.

Figure 7:
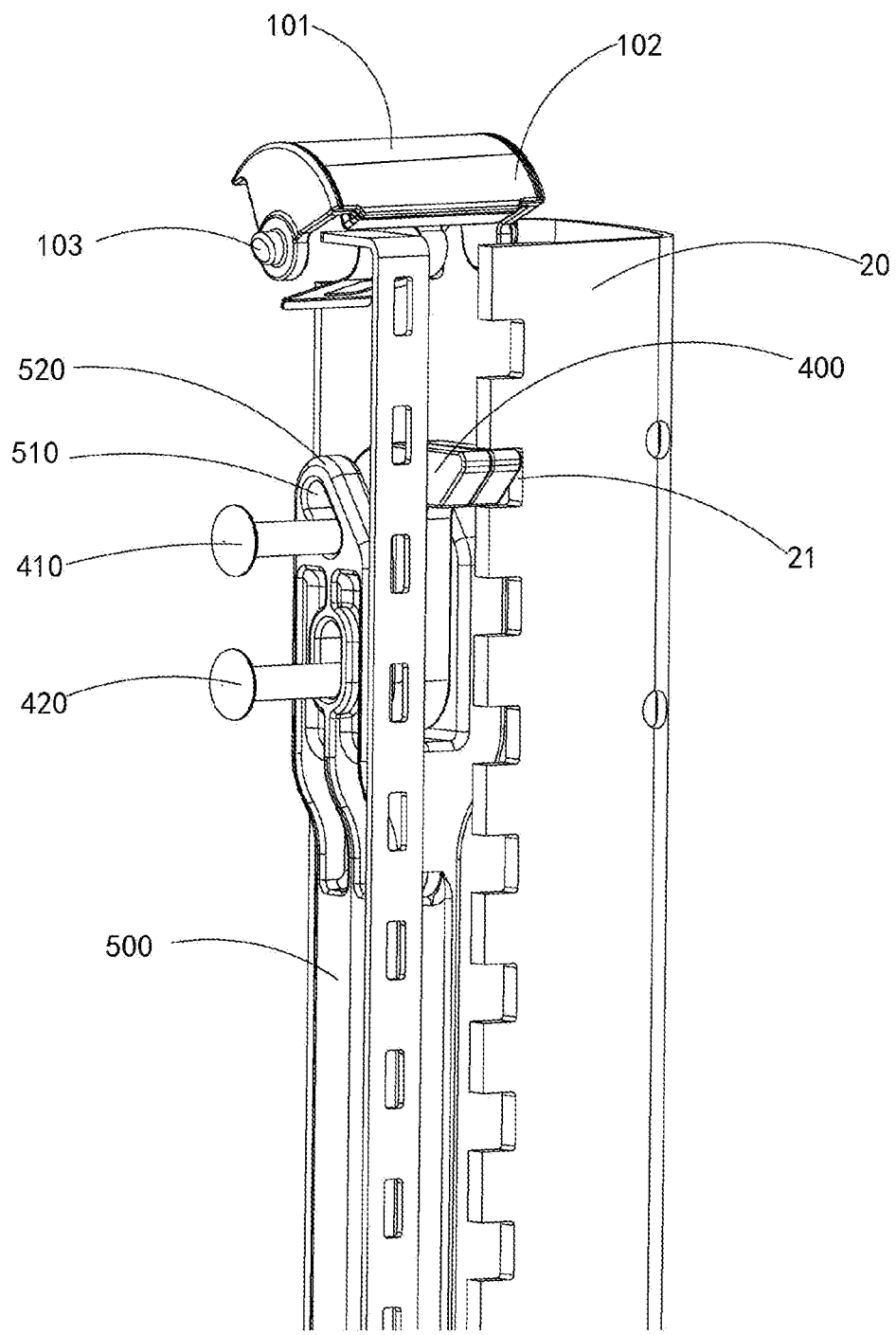
FIG. 7 is an enlarged view of some parts of the upper half of the indicator assembly after removing the driving member and the pushing member, especially showing an assembling relationship between a stage locking member and a pulling rod.

Cooperation relationship among various components in the indicator assembly according to the present disclosure will be described in detail in conjunction with FIGS. 5-7.

When the lower end 320 of the driving member 300 does not touch the floor, the indicating member 100 pivots to the first position in the first direction under the acting force of the first elastic member 120, so that the first area 101 is exposed from the indicator window 111.

When the lower end 320 of the driving member 300 touches the floor, as mentioned above, the driving member 300 moves upward relative to the second tubular member 30, and also drives the pushing member 200 to move upward by the engagement of the engaging hook 310 and the engaging hole 210, so that the top end 220 of the pushing member 200 pushes the indicating member 100 to overcome the acting force of the first elastic member 120, thus the indicating member 100 pivots to the second position in the second direction, and the second area 102 is exposed from the indicator window 111.

In this way, it is realized that the first area 101 and the second area 101 of the indicating member 100 can be alternatively exposed from the indicator window 111 under different conditions, so that the user can more conveniently observe whether the supporting leg device 10 has touched the vehicle floor, thereby ensuring the safety and reliability of the safety seat.

Hereinafter, a locking mechanism of the supporting leg device 10 will be described in detail.

That is, a matching structure between the first tubular member 20 and the second tubular member 30 of the supporting leg device 10 and how the first tubular member 20 and the second tubular member 30 are locked with each other will be described in detail.

Figure 9:
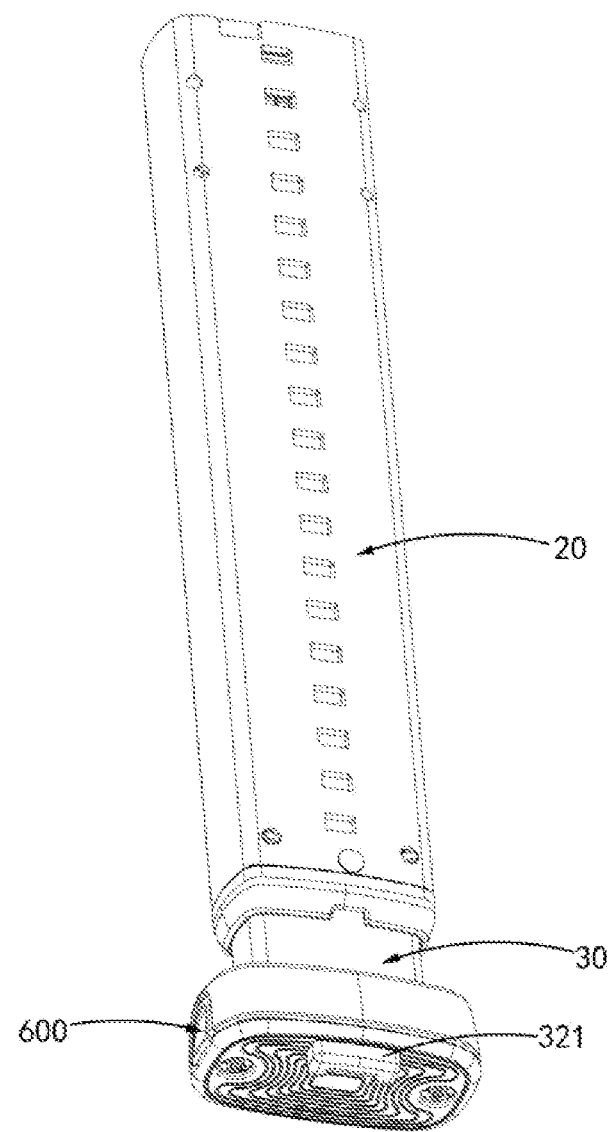
FIG. 9 is a perspective view of the supporting leg device.

As shown in FIG. 9, an inner diameter of the first tubular member 20 is larger than an outer diameter of the second tubular member 30, so that there is a certain gap between an inner side of the first tubular member 20 and an outer side of the second tubular member 30. This is helpful relatively sliding of the second tubular member 30 within the first tubular member 20.

Figure 10:
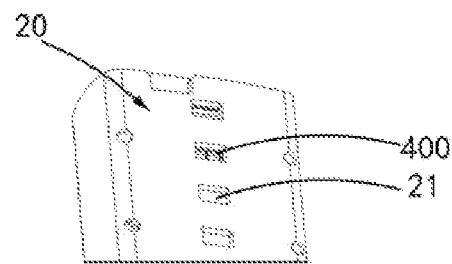
FIG. 10 is a partial enlarged view showing a matching relationship between the stage locking member and a stage engaging hole.

When the second tubular member 30 slides relative to the first tubular member 20, the supporting leg device 10 is driven to extend to an appropriate length, for example, when the supporting leg device 10 extends to the vehicle floor, it is necessary that the first tubular member and the second tubular member 30 are mutually locked so as to keep the supporting leg device at an appropriate length. To this end, the first tubular member 20 is provided with a plurality of stage locking holes 21 longitudinally arranged, and the second tubular member 30 is provided with a stage locking member 400. In the embodiment shown in FIGS. 5-7, the stage locking member 400 is provided with a positioning pin 420 supported on the inner wall of the second tubular member so that the stage locking member 400 is pivotable within the second tubular member 30. Therefore, after a position of the second tubular member 30 relative to the first tubular member 20 is determined, the stage locking member 400 is operably engaged into one of the plurality of stage locking holes 21, as shown in FIG. 10, thereby realizing mutual locking of the first tubular member and the second tubular member 30. The size of the stage locking member 400 is slightly smaller than that of the stage engaging hole 21. In an embodiment, the size of the stage locking member 400 is similar to that of the stage engaging hole 21, so that the stage locking member 400 is tightly engaged into the stage engaging hole 21. In addition, the stage locking member 400 may have a raised structure, such as a tab, a raised rod, etc., and the present disclosure is not limited thereto. The stage locking member 400 may be positively engaged into the stage engaging hole 21.

In a process of adjusting the length of the supporting leg device 10, the stage locking member 400 is also operably disengaged from the stage engaging hole 21, so that the first tubular member 20 and the second tubular member 30 are unlocked, and the second tubular member 30 may slide relative to the first tubular member 20 again to adjust the position of the second tubular member 30 relative to the first tubular member 20, which will be described in detail below.

Next, an unlocking mechanism of the supporting leg device 10 will be described in detail.

When the supporting leg device 10 is ready to be folded, it is necessary to release the mutual locking of the first tubular member 20 and the second tubular member 30, that is, to disengage the stage locking member 400 from the stage engaging hole 21, so that the second tubular member 30 can slides relative to the first tubular member 20.

The present disclosure provides an arrangement structure that disengages the stage locking member 400 from the stage engaging hole 21 and also disengages the engaging hook 310 from the engaging hole 210.

In conjunction with FIGS. 5-8, the arrangement structure includes a pulling rod 500 extending longitudinally in the second tubular member 30. The pulling rod 500 is movable vertically rather than horizontally within the second tubular member 30.

Firstly, in order to disengage the stage locking member 400 from the stage engaging hole 21, the top end of the pulling rod 500 is provided with an elongated inclined slot 510 extending obliquely relative to the longitudinal direction of the supporting leg device 10, and the stage locking member 400 is provided with a driving pin 410 which passes through the inclined slot 510. An inclined direction of the inclined slot 510 is set such that when the pulling rod 500 moves downward, the inclined slot 510 can force the driving pin 410 to be displaced in the horizontal direction, so that the driving pin 410 drives the stage locking member 400 to disengage from the stage engaging hole 21.

In one embodiment, the upper part of the pulling rod 500 has an opening in which the stage locking member 400 is located. In an embodiment, the opening may be U-shaped, as shown in FIG. 7. In this case, the inclined slots 510 are disposed on two opposite sides 520 of the U-shaped opening. However, the present disclosure is not limited to this, and the opening at the upper part of the pulling rod 500 may also have other shapes as long as the stage locking member 400 can be accommodated therein. Alternatively, the upper part of the pulling rod 500 may not have an opening. In this case, the inclined slot 510 is formed by penetrating through the upper part of the pulling rod 500, and the stage locking member 400 are arranged side by side with respect to the upper part of the pulling rod 500, so that the driving pin 410 on the stage locking member 400 passes through the inclined slot 510.

Secondly, in order to separate the engaging hook 310 from the engaging hole 210, the upper part of the driving member 300 is provided with a driving slot 330 extending longitudinally with respect to the supporting leg device 10, and the driving pin 410 also passes through the driving slot 330. Therefore, when the driving pin 410 is displaced in the horizontal direction under the action of the inclined slot 510, the driving pin 410 drives the driving slot 330 and further drives the upper part of the driving member 300 to displace in the horizontal direction, so that the engaging hook 310 at the upper end of the driving member 300 is disengaged from the engaging hole 210 of the pushing member 200.

Figure 8:
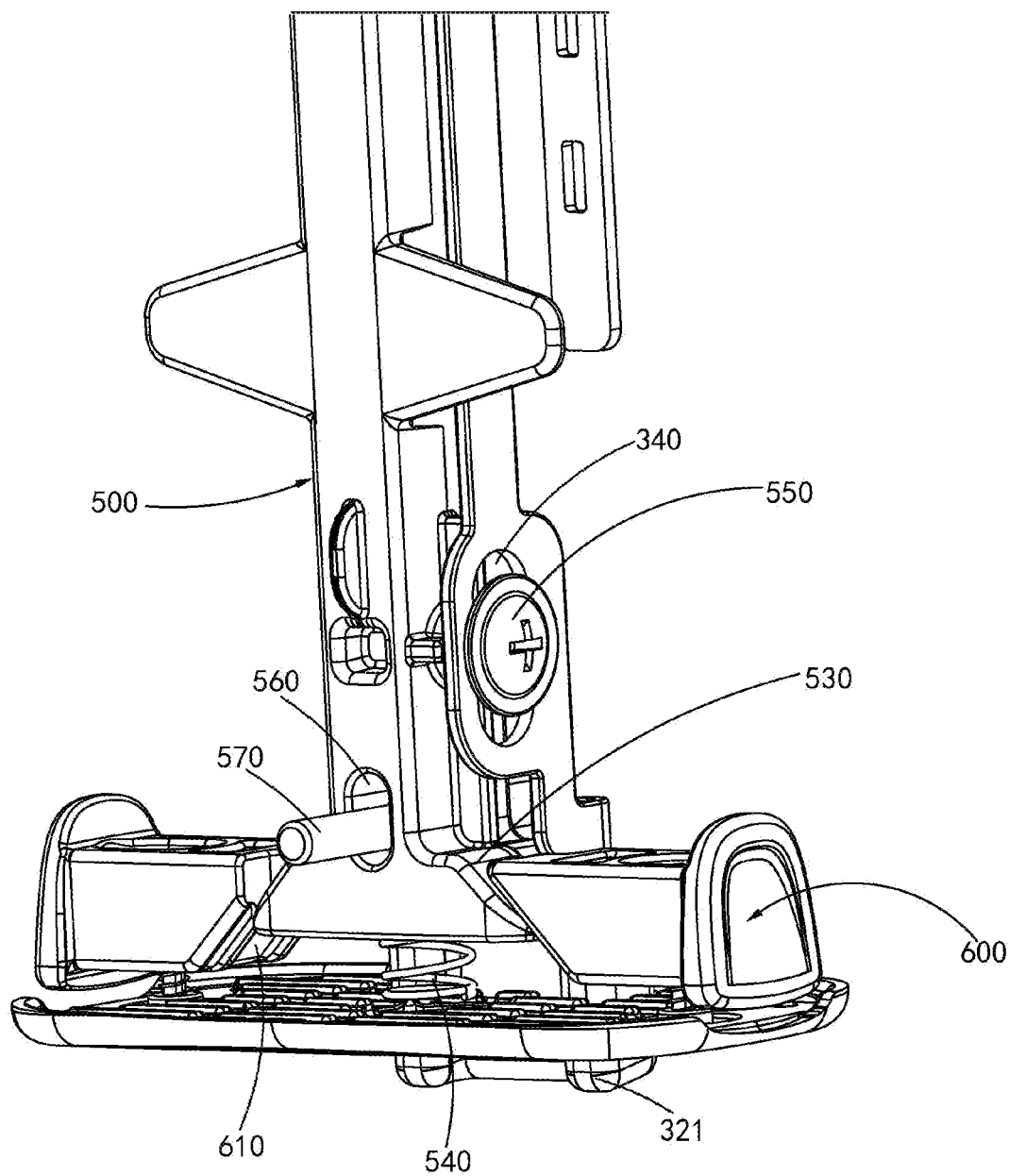
FIG. 8 is an enlarged view of some parts of the lower half of the indicator assembly in FIG. 5.

As shown in FIG. 4 and FIG. 8, a supporting pin 550 may be fixedly provided on the lower part of the pulling rod 500, and an elongated supporting slot 340 is provided on the lower part of the driving member 300. The supporting pin 550 passes through the supporting slot 340 such that the driving member 300 can be vertically movably supported on the pulling rod 500, and the driving member 300 can pivot around the supporting pin 550 such that the upper part of the driving member 300 can be displaced in the horizontal direction.

Further, when the supporting leg device 10 is folded, the lower end 320 of the driving member 300 no longer touches the floor. In order to reset the driving member 300, a tension spring 350 may be installed between the lower part of the driving member 300 and the lower part of the pulling rod 500, and is arranged to drive the driving member 300 to move downward relative to the pulling rod 500, as shown in FIG. 12. In the embodiment of FIG. 12, the lower part of the driving member 300 is provided with a rivet 360, and the lower part of the pulling rod 500 is provided with a wing 580. The tension spring 350 has one end hooked on the rivet 360 and the other end hooked on a hole of the wing 580, thus facilitating for the installation of the tension spring 350. Of course, the tension spring 350 may also be installed in other ways. In this way, once the lower end 320 of the driving member 300 no longer touches the floor, the driving member 300 is pulled by the tension spring 350 to move downward, that is, the driving member 300 no longer pushes the pushing member 200 upward. Meanwhile, since a tip of the engaging hook 310 has an inclined lower part 311 (as shown in FIG. 4). An inclined direction of the inclined lower part 311 is set such that when the engaging hook 310 moves downward, the inclined lower part 311 interacts with the lower edge of the engaging hole 210, so that the engaging hook 310 is disengaged from the engaging hole 210. In this way, since the driving member 300 no longer generates upward pushing force against the pushing member 200 and the pushing member 200 no longer generates pushing force against the indicating member 100, the indicating member 100 can pivot to the first position in the first direction under the acting force of the first elastic member 120, so that the first area 101 is exposed from the indicator window 111.

Thirdly, in order to facilitate the user to move the pulling rod 500 downward, in one embodiment of the present disclosure, the bottom end of the pulling rod 500 is provided with a driving slop 530 which may be integrally formed to both sides of the bottom end of the pulling rod 500 or secured to both sides of the bottom end of the pulling rod 500 by means of a connecting member. Meanwhile, a stage adjustment button 600 is provided at the bottom end of the supporting leg device 10, particularly, the stage adjustment button 600 may be provided at the bottom end of the second tubular member 30. Furthermore, the stage adjustment button 600 is provided with a button slope 610 in contact with the driving slope 530. Inclined directions of the driving slop 530 and the button slop 610 are set such that when the stage adjustment button 600 is pressed, the button slop 610 and the driving slop 530 interact to make the pulling rod 500 move downward, as shown in FIG. 8.

In addition, a second elastic member 540 is also disposed on the bottom end of the pulling rod 500. In an embodiment, as shown in FIG. 8, the second elastic member 540 may be disposed below the bottom end of the pulling rod 500 to force the pulling rod 500 to move upward, but the position of the second elastic member 540 is not limited to this embodiment. The second elastic member 540 is made of an elastic material, and may be a spring, a spring sheet or any elastic element capable of providing driving force. Because of the presence of the second elastic member 540, when the stage adjustment button 600 is not pressed, the second elastic member 540 forces the pulling rod 500 to move upward, so that the driving slope 530 pushes the button slope 610, and thus the stage adjustment button 600 moves radially outward to an initial position. In addition, in order to limit the vertical movement range of the pulling rod 500, the pulling rod 500 may also be provided with a long limiting slot 560 extending along the longitudinal direction of the pulling rod, and a limiting shaft 570 passes through the limiting slot 560 and may be secured to the side wall of the second tubular member 30.

An advantageous effect of the present disclosure is that the indicator assembly of the supporting leg device for the safety seat according to the present disclosure allows the user to check whether the supporting leg device has touched the floor of the vehicle without leaning over, and thus ensure that the safety seat is firmly supported by the supporting leg device.

The foregoing embodiments and advantages are merely exemplary and are not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

What is claimed is:

1. An indicator assembly of a supporting leg device for a safety seat, comprising
an indicator housing positioned at an upper end of the supporting leg device and having an indicator window that is formed by penetrating through the indicator housing;
an indicating member including a first area and a second area which are adjacent to each other and have different colors or patterns, the indicating member being pivotally accommodated in the indicator housing so that the first area and the second area can be alternatively exposed from the indicator window;
a first elastic member disposed in the indicator housing and driving the indicating member to pivot to a first position along a first direction;
a pushing member extending in a longitudinal direction of the supporting leg device inside the supporting leg device, being movable vertically, and having a plurality of engaging holes arranged longitudinally, and a top end of the pushing member capable of pushing the indicating member to pivot to a second position in a second direction opposite to the first direction;
a driving member extending in a longitudinal direction of the supporting leg device inside the supporting leg device, being movable vertically, and including an upper end provided with an engaging hook and a lower end capable of touching a floor, in which the engaging hook is operably engaged into one of the plurality of engaging holes of the pushing member;
wherein when the lower end of the driving member does not touch the floor, the indicating member pivots to the first position in the first direction under the acting force of the first elastic member such that the first area is exposed from the indicating window; and
when the lower end of the driving member touches the floor, the driving member drives the pushing member to move upward by means of the engagement of the engaging hook and the engaging hole, thus the top end of the pushing member pushes the indicating member and overcomes the acting force of the first elastic member and pivots to the second position in the second direction, so that the second area is exposed from the indicating window.

2. The indicator assembly of the supporting leg device for a safety seat according to claim 1, wherein the supporting leg device comprises:
a first tubular member, the upper end of which is connected to the indicator housing, and the first tubular member is provided with a plurality of stage locking holes arranged longitudinally;
a second tubular member slidably disposed inside the first tubular member, and a stage locking member is arranged in the second tubular member;
wherein the stage locking member is operably engaged into one of the plurality of the stage locking holes, so as to lock a position of the second tubular member relative to the first tubular member.

3. The indicator assembly of the supporting leg device for the safety seat according to claim 2, wherein the stage locking member is provided with a positioning pin supported on an inner wall of the second tubular member such that the stage locking member is pivotable within the second tubular member.

4. The indicator assembly of the supporting leg device for the safety seat according to claim 2, wherein a longitudinally extended pulling rod is disposed within the second tubular member, and the pulling rod is movable vertically rather than horizontally within the second tubular member; an inclined slot is disposed at a top end of the pulling rod, a driving slot is disposed on an upper part of the driving member, a driving pin is disposed on the stage locking member, and the driving pin passes through the inclined slot and the driving slot; an inclined direction of the inclined slot is set such that when the pulling rod moves downward, the inclined slot forces the driving pin to be displaced in a horizontal direction, thus the driving pin drives the stage locking member to disengage from the stage locking hole; the driving pin further drives the driving slot so as to drive an upper part of the driving member to be displaced in the horizontal direction, thereby disengaging the engaging hook on the upper end of the driving member from the engaging hole of the pushing member.

5. The indicator assembly of the supporting leg device for the safety seat according to claim 4, wherein an upper part of the pulling rod has a U-shaped opening, in which the stage locking member is located, and the inclined slots are disposed on two opposite sides of the U-shaped opening.

6. The indicator assembly of the supporting leg device for the safety seat according to claim 4, wherein a driving slope is disposed at a bottom end of the pulling rod, and a stage adjustment button is disposed at a bottom end of the second tubular member and is provided with a button slope in contact with the driving slope, and the inclined directions of the driving slope and the button slope are set such that when the stage adjustment button is pressed, the button slope and the driving slope interact to make the pulling rod move downward.

7. The indicator assembly of the supporting leg device for the safety seat according to claim 4, wherein a second elastic member is disposed at a bottom end of the pulling rod, and forces the pulling rod to move upward.

8. The indicator assembly of the supporting leg device for the safety seat according to claim 4, wherein a supporting slot is disposed at a lower part of the driving member, and a supporting pin secured to the pulling rod passes through the supporting slot such that the driving member is vertically movably supported on the pulling rod and the driving member is pivotable around the support pin.

9. The indicator assembly of the supporting leg device for the safety seat according to claim 4, wherein a tension spring is installed between the lower part of the driving member and the lower part of the pulling rod, and the tension spring is arranged to drive the driving member to move downward relative to the pulling rod.

10. The indicator assembly of the supporting leg device for the safety seat according to claim 2, wherein the pushing member is vertically movably arranged on an inner side wall of the first tubular member.

11. The indicator assembly of the supporting leg device for the safety seat according to claim 1, wherein a floor touching member is disposed at the lower end of the driving member, and a bottom of the floor touching member is enclosed by an anti-collision and anti-sliding member.

12. A safety seat employing the indicator assembly of the supporting leg device for the safety seat according to claim 1.

* * * * *